United States Patent
Rosen (10) Patent No.: US 8,013,916 B2
(45) Date of Patent: Sep. 6, 2011

(54) DETECTION AND/OR CORRECTION OF SUPPRESSED SIGNAL DEFECTS IN MOVING IMAGES

(75) Inventor: Daniel Scott Rosen, Thousand Oaks, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

(21) Appl. No.: 12/772,488

(22) Filed: May 3, 2010

(65) Prior Publication Data

US 2010/0214450 A1  Aug. 26, 2010

Related U.S. Application Data

(63) Continuation of application No. 11/381,107, filed on May 1, 2006, now Pat. No. 7,710,472.

(51) Int. Cl.
*H04N 9/64* (2006.01)
*H04N 5/217* (2011.01)

(52) U.S. Cl. .......................................... 348/246; 348/241

(58) Field of Classification Search ........................ None
See application file for complete search history.

(56) References Cited

U.S. PATENT DOCUMENTS

| | | | |
|---|---|---|---|
| 6,014,471 A * | 1/2000 | Barkan et al. | 382/275 |
| 6,061,092 A | 5/2000 | Bakhle et al. | |
| 6,233,364 B1 | 5/2001 | Krainiouk et al. | |
| 6,414,661 B1 | 7/2002 | Shen et al. | |
| 6,415,063 B1 | 7/2002 | Pourjavid | |
| 6,593,961 B1 * | 7/2003 | Perino | 348/187 |
| 6,611,288 B1 * | 8/2003 | Fossum et al. | 348/246 |
| 6,625,318 B1 | 9/2003 | Tan et al. | |
| 6,643,410 B1 * | 11/2003 | Yu et al. | 382/268 |
| 6,667,766 B2 | 12/2003 | Matsutani et al. | |
| 6,753,914 B1 * | 6/2004 | Frost | 348/246 |
| 2002/0080917 A1 | 6/2002 | Granfors et al. | |
| 2002/0145673 A1 * | 10/2002 | Bompard | 348/246 |
| 2003/0053142 A1 * | 3/2003 | Wengender | 358/437 |
| 2004/0095488 A1 * | 5/2004 | Rambaldi et al. | 348/246 |
| 2004/0233306 A1 | 11/2004 | Basting et al. | |
| 2005/0099505 A1 | 5/2005 | Suzuki | |
| 2005/0100236 A1 * | 5/2005 | Kong et al. | 382/261 |
| 2005/0117035 A1 | 6/2005 | Hofflinger et al. | |
| 2005/0286097 A1 | 12/2005 | Hung et al. | |
| 2006/0012695 A1 | 1/2006 | Chang et al. | |
| 2006/0204127 A1 * | 9/2006 | Muammar et al. | 382/274 |
| 2006/0215046 A1 * | 9/2006 | Tibi et al. | 348/246 |
| 2006/0238630 A1 * | 10/2006 | Moody et al. | 348/247 |
| 2007/0076101 A1 | 4/2007 | Baer | |

* cited by examiner

*Primary Examiner* — Sinh Tran
*Assistant Examiner* — Jason Flohre
(74) *Attorney, Agent, or Firm* — Fish & Richardson P.C.

(57) ABSTRACT

Techniques are described for detecting a vertical line artifact in an image captured with a digital camera. The vertical line artifact may be caused by a defect in the digital camera. Techniques also are described for correcting a vertical line artifact in an image captured with a digital camera. It may be determined that the vertical line artifact includes at least one pixel in the vertical line having a non-zero suppressed signal. A value for the pixel having the non-zero suppressed signal may be determined. A statistically-based correction may be applied to the pixel having the non-zero suppressed signal based on the determination that the pixel has a non-zero suppressed signal and the determined value of the pixel. The image may be a portion of a movie stored on a DVD.

20 Claims, 9 Drawing Sheets

For CAMERA ROSEN at first exposure
having true mean of μ and true standard deviation of σ

| Defective Column Location | | Mean (μd) | Standard Deviation (σd) | T-Score | Delta From True Mean (Δ) | Correction Factor (CF) |
|---|---|---|---|---|---|---|
| Column Number (610a) | Channel (1=Red; 2=Green; 3=Blue) (610b) | | | | | |
| 10 | 2 | μd_1 | σd_1 | T_1 | Δ_1 | CF_1 |
| 100 | 1 | μd_2 | σd_2 | T_2 | Δ_2 | CF_2 |
| 125 | 3 | μd_3 | σd_3 | T_3 | Δ_3 | CF_3 |

DETECTION AND/OR CORRECTION OF SUPPRESSED SIGNAL DEFECTS IN MOVING IMAGES

CROSS-REFERENCE TO RELATED APPLICATIONS

This application is a continuation of U.S. patent application Ser. No. 11/381,107, filed May 1, 2006. The entire contents of the prior application is incorporated herein by reference.

TECHNICAL FIELD

This document relates to detecting and correcting suppressed signal defects.

BACKGROUND

Solid state imaging devices, such as charge coupled devices (CCDs) or complementary metal oxide semiconductor (CMOS) devices, may possess defects, which are introduced during the manufacturing process. The defects may include imaging sites that are non-functioning (dead pixels), imaging sites that are always at full strength (ringing pixels) or imaging sites that transfer only a percentage of a total signal (suppressed pixels).

SUMMARY

In a first general aspect, a vertical line artifact is corrected. Image data captured from a digital camera is accessed. The image data includes a vertical line artifact arising from a defect in the digital camera. It is determined that the vertical line artifact includes at least one pixel in the vertical line having a non-zero suppressed signal. A value for the pixel having the non-zero suppressed signal is determined. A correction for the pixel having the non-zero suppressed signal is determined based on the determination that the pixel has a non-zero suppressed signal and the determined value of the pixel. The correction is applied to the pixel having the non-zero suppressed signal.

With respect to at least the first general aspect, implementations may include one or more of the following. For example, determining the correction may include determining a statistical correction. Applying the statistical correction to the pixel having the non-zero suppressed signal may include applying the statistical correction based on a uniform random variate and the value for the pixel having the non-zero suppressed signal.

The vertical line artifact may be detected using information obtained from a gray card. The information obtained from the gray card may include statistical data related to the vertical line artifact and a non-defective column of pixels. The information may be obtained from more than one gray card such that each gray card is related to a particular exposure level for a particular digital camera. Information about a vertical line artifact that exists at an exposure other than the particular exposures related to the more than one gray card may be obtained by interpolating between the more than one gray card based on a correction curve.

The statistical data may include a mean and a standard deviation. The defect in the digital camera may include a defect in a solid state imager of the digital camera.

In at least a second general aspect, a vertical line artifact is detected in a column of pixels. Image data captured from a digital camera is accessed. The image data includes a vertical line artifact arising from a defect in the digital camera. A non-defective column of pixels is identified in the image data. Statistical data is determined for an untested column of pixels in the image data. The untested column of pixels is a column of pixels other than the non-defective column. The statistical data for the untested column of pixels is converted into a score. The score is compared to a threshold value. Based on the comparison, it is determined that there is a vertical line artifact at the untested column of pixels.

With respect to at least the second general aspect, implementations may include one or more of the following. For example, the statistical data may include a mean and a standard deviation. The defect in the digital camera may include a defect in a solid state imager of the digital camera.

In at least a third general aspect, a vertical line artifact is corrected by a digital camera system. The digital camera system includes a digital camera for capturing image data and a processor. The processor is configured to access image data captured by the digital camera. The image data includes a vertical line artifact arising from a defect in the digital camera. The processor is configured to determine that the vertical line artifact includes a pixel having a non-zero suppressed signal. The processor is configured to determine a value for the pixel having the non-zero suppressed signal, determine a correction for the pixel having the non-zero suppressed signal based on the determined value of the pixel, and apply the correction to the pixel.

With respect to at least the third general aspect, implementations may include one or more of the following. For example, the processor may be configured to determine a statistical correction. The processor may be configured to apply the statistical correction based on a uniform random variate and the value for the pixel having the non-zero suppressed signal.

The processor may be configured to detect the vertical line artifact using information obtained from a gray card and obtain information from the gray card that includes statistical data related to the vertical line artifact and a non-defective column of pixels. The processor may be configured to obtain the information from more than one gray card such that each gray card is related to a particular exposure level for a particular digital camera. The processor may be configured to obtain information about a vertical line artifact that exists at an exposure other than the particular exposures related to the more than one gray card by interpolating between the more than one gray card based on a correction curve.

The statistical data may include a mean and a standard deviation. The defect in the digital camera may include a defect in a solid state imager of the digital camera.

In a fourth general aspect, a post-production processing host includes a computer-readable medium. The computer-readable medium has embodied thereon a computer program product. The computer program product includes a first code segment for accessing image data captured by a digital camera. The image data includes a vertical line artifact arising from a defect in the digital camera. The computer program product includes a second code segment for determining that the vertical line artifact includes a pixel having a non-zero suppressed signal. The computer program product includes a third code segment for determining a value for the pixel having the non-zero suppressed signal, a fourth code segment for determining a correction for the pixel having the non-zero suppressed signal based on the determined value of the pixel, and a fifth code segment for applying the correction to the pixel.

In a fifth general aspect, a portable storage device includes a medium configured to record information. The portable storage device includes a first frame recorded on the medium. The first frame corresponds to image data captured by a digital camera. The image data previously included a vertical line artifact arising from a defect in the digital camera. The portable storage device includes a second frame recorded on the medium. The second frame corresponds to the image data captured by the digital camera. At least the first frame and the second frame are included in a sequence of frames recorded on the medium. The sequence of frames is configured to reproduce a display of the image data, in at least the first frame, that previously included a vertical line artifact arising from the defect in the digital camera. The display of the content is substantially free of a vertical line artifact caused by a defect in a digital camera and any residual vertical line artifacts caused by insufficient correction techniques.

With respect to at least the fifth general aspect, implementations may include one or more of the following. For example, the portable storage device may be a DVD. The sequence of frames may include an entire movie. A vertical line artifact and any residual vertical line artifacts may be visually imperceptible to an audience viewing the display of the content.

Implementations of any of the techniques described may include a method or process, an apparatus or system, or computer software on a computer-accessible medium. The details of particular implementations are set forth below. Other features will be apparent from the description and drawings, and from the claims.

DETAILED DESCRIPTION

Many defects encountered in imaging devices, particularly solid state imaging devices, the defect may exist in the same physical location, both in geometry and color channel, and may affect a large number, if not all, frames. In some cases, every frame of an image captured with the device may be affected.

An imaging site corresponds to a single pixel. A single dead, ringing or suppressed (collectively referred to as "defective") pixel may be visible in an image captured with a solid state imaging device. The defective pixel may look like a tiny black spot, or another color that does not correspond to the actual image. A set of defective pixels, typically a column of defective pixels, may appear in the image as a vertical line that extends over a long distance, such as, for example, more than 50%, of the imaging area. The vertical line may be referred to as a vertical line artifact, a vertical line defect or a linear feature.

A single defective pixel may be fixed by replacing the defective pixel with an alternate pixel value, which may be referred to as inpainting, dust busting or stitching. The alternate pixel value may be an average of the values of pixels adjacent to the defective pixel or may be a random value. When the solid state imaging device is a low resolution digital video camera or a high resolution digital still image camera, this correction technique may provide satisfactory results. Should the number of defects presented in an image by these devices degrade to a point where an operator is no longer satisfied, an imaging sensor of the device may be replaced.

However, using the same technique to attempt to correct a defective column of pixels that creates a vertical line artifact may yield unsatisfactory results. For example, although a completely black line may no longer appear in the image, a new vertical line, referred to as a residual vertical line artifact, still may be perceived in the image at the location of the original vertical line artifact. The new vertical line, or residual vertical line artifact, may appear as having the same color as pixels in adjacent columns, but instead of looking natural and blending into the surrounding pixels, the new vertical line may stand out and appear as too-smooth compared to the surrounding pixels. The new vertical line may or may not be correctable by a post-processing correction technique. Furthermore, when the imaging device is a high resolution motion picture digital capture system, both the original vertical line artifact, and any new vertical line that may appear after attempted correction, may appear in every frame of the moving image at the same location.

Because high resolution motion picture digital capture systems have only been recently released to the market, current correction techniques, described above as failing to satisfactorily correct vertical line artifacts, have been based on assumptions related to the cause and extent of the vertical line artifact.

One model is based on the assumption that the vertical line artifacts are caused by defective read-out wells. In this model, the defective read-out wells block a complete read-out of an entire column of pixels, thus creating a vertical line artifact. The read-out of the column of pixels may be conceptualized as a bucket brigade such that a particular pixel in a column receives a signal from a pixel above or below the particular pixel. However, the assumption underlying this model may fail. If a defective read-out well were the true cause of the vertical line artifacts, some of the pixels in the column would pass on a full-strength signal. As the read-out failed, pixels below the pixels in the column that are passing on a full-strength signal would only pass on a partial signal or no signal at all. As such, the vertical line artifact would only appear as a half-column of defective pixels. However, since the actual vertical line artifact may extend from top to bottom of an entire column of pixels, this assumption may be incorrect. As a result, images corrected with this model, based on a possibly incorrect assumption, may not successfully correct the vertical line artifacts.

Another model uses an inpainting solution, such as stitching, to correct vertical line artifacts. This model works by replacing the value of pixels in the defective column with an average of pixel values from pixels in adjoining columns. However, this model may fail due to an underlying assumption that columns of pixels adjoining the defective column are not similarly defective and that the pixels in the defective column do not include any usable signal (i.e., the column only includes dead pixels). As a result, images corrected using the stitching model may replace the original vertical line artifact with a new vertical line that may still be perceived as cutting into the image at the location of the original vertical line artifact.

In many instances, pixels in the defective column may in fact have a signal, although the signal may not be full-strength. Thus, the pixels in a defective column may be suppressed pixels, rather than dead or ringing pixels. Replacing the defective pixels with an average of adjacent pixel values, or randomly reassigning the defective pixels, may not take advantage of the information available from the partial signal content.

Determining that the pixels in a defective column that make up a vertical line artifact may be suppressed enables a determination of statistical methods to automatically detect vertical line artifacts in images captured with solid state imaging devices and to satisfactorily correct the vertical line artifacts that may be detected.

Techniques may be described for correcting a vertical line artifact. The vertical line artifact may be corrected by accessing image data captured from an imaging device, e.g., a digital camera. The image data may include a vertical line artifact arising from a defect in the digital camera. The correction also includes determining that the vertical line artifact includes a non-zero suppressed signal for a pixel in the vertical line and determining a value for the pixel in the vertical line. The correction further may include determining a correction for the pixel based on the determination that the pixel has a non-zero suppressed signal and also based on the determined value for the pixel. The correction may then be applied to the pixel.

For example, an image may be captured with a solid state imaging device, such as a digital camera. The digital camera may include a defect that causes a vertical line artifact to be present in the captured image. To correct the vertical line artifact, it may first be determined that pixels in a column (i.e., a defective column) that makes up the vertical line artifact may include a suppressed signal, rather than, for example, no signal at all. Actual pixel values for pixels in a column that is not defective (i.e., a column that does not create a vertical line artifact to appear in the image) also may be determined. A correction for the vertical line artifact then may be determined based on the signal information present in the pixels in the defective column and the values of the pixels in the non-defective column. Both pieces of information may be used to determine the correction such that a goal of the correction may be to enhance the suppressed signal of the pixels in the defective column to achieve pixel values in the presently defective column that are commensurate with the values of pixels in the non-defective column. The correction then may be applied to the pixels in the defective column, causing the vertical line artifact to disappear or become reduced in prominence.

Figure 1:
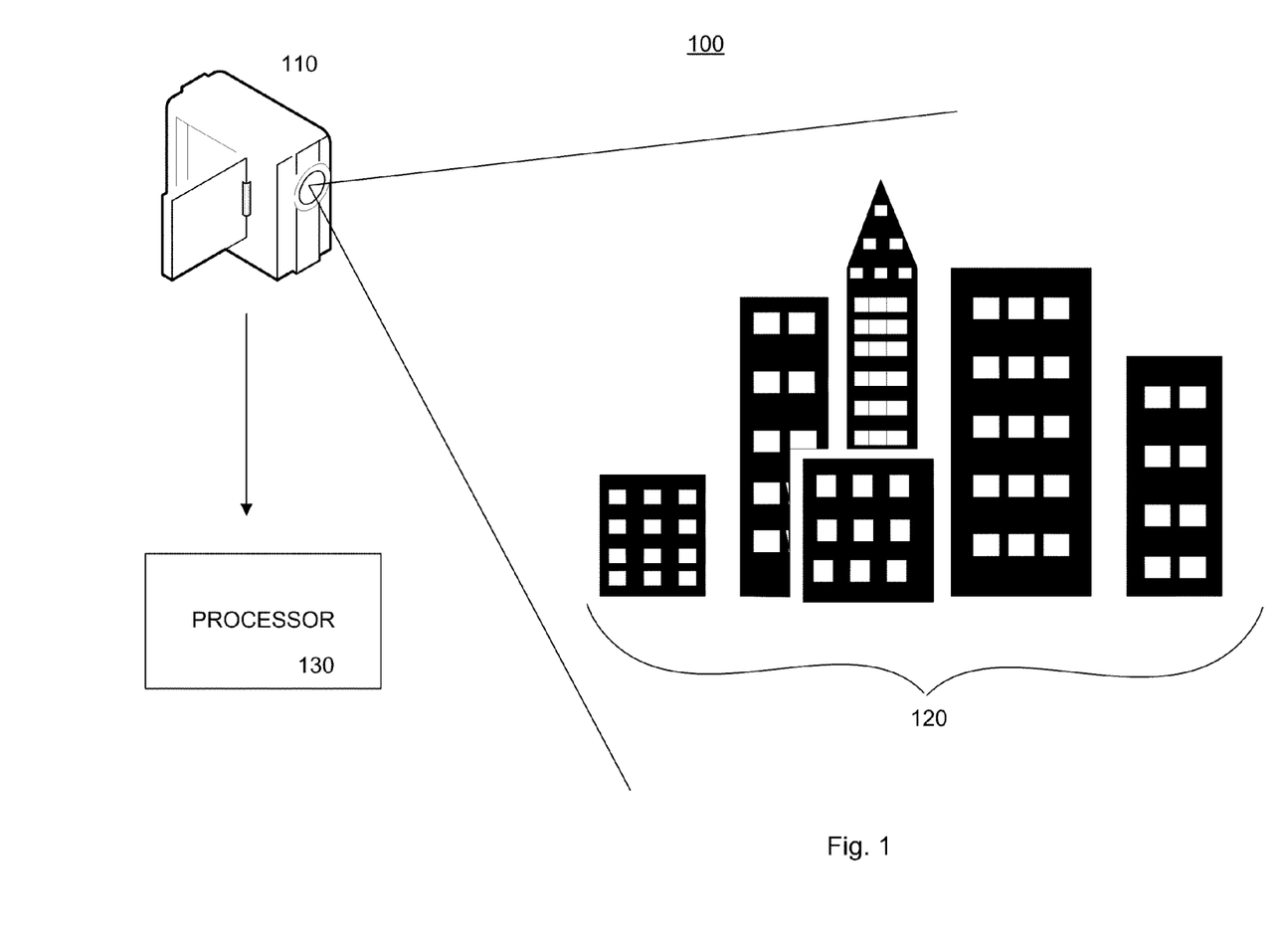
FIG. 1 is an illustration of a digital camera capturing image data and sending a resulting image to a processor.

FIG. 1 is an illustration 100 of a digital camera 110 capturing image data 120 and sending a resulting image to a processor 130. Digital camera 110 may include a high resolution motion picture digital capture system that includes a solid state imaging device, such as a charge coupled device (CCD) or complementary metal oxide semiconductor (CMOS) device.

A CCD camera, for example, has a solid state imager (SSI) that includes a small, rectangular piece of processed silicon (referred to as a silicon wafer), rather than a piece of film, to receive incoming light. The silicon wafer is a solid-state electronic component that has been segmented into an array of individual light-sensitive cells, called picture elements or pixels. When the shutter of a CCD camera is open, photons hit the silicon wafer. When photons hit the silicon wafer at a certain pixel, electrons are released and the electrons accumulate within that pixel. When the light source is extinguished, i.e., when the shutter is closed, the image captured, such as, for example image data 120 which represents a city skyline, may be sent to a processor, such as processor 130. Processor 130 may unload the array of pixels, count the electrons in each pixel and process the resulting data into an image. The image then may be placed on film or digital media to make the image perceivable.

Defects may be present in digital camera 110. More particularly, the SSI of digital camera 110 may be defective. The defect in the SSI may cause an image captured with digital camera 110 to include a vertical line that extends over a long distance, such as, for example, more than 50%, of the imaging area. The vertical line artifact may appear in the same location, both with respect to geometry (physical column location, such as, for example, at column 100) and color channel (such as one of color channels red, green or blue) in many, if not all, frames of a large number of images, if not every image, captured with digital camera 110. The vertical line artifacts may continue to appear in images captured with digital camera 110 until the defective imager is replaced. The vertical line artifact may be present in only one color channel at each location, but defects may exist at various locations in various color channels for a single digital camera. For example, a vertical line artifact may exist at column 50 in the red channel and another vertical line artifact may exist at column 75 in the blue channel.

The defects that cause vertical line artifacts may be unique to digital camera 110. Thus, the detection and correction of the vertical line artifacts in images captured with digital camera 110 also may be unique to digital camera 110. However, when similar defects exist in other cameras, the same techniques as described in this document may be used to detect and correct vertical line artifacts caused by defects in the other cameras.

Once a vertical line artifact is detected in an image captured with digital camera 110, processor 130 may be configured to detect and correct vertical line artifacts in future images captured by digital camera 110. Processor 130 may be configured to do so before or after processing the electron density data into an image, but before placing the image on the film or other digital media. Alternatively, processor 130 may only be configured to directly process the array of pixels into an image and another processor (not shown) may be configured to detect and correct vertical line artifacts present in the image resulting from the processing by processor 130.

Figure 2:
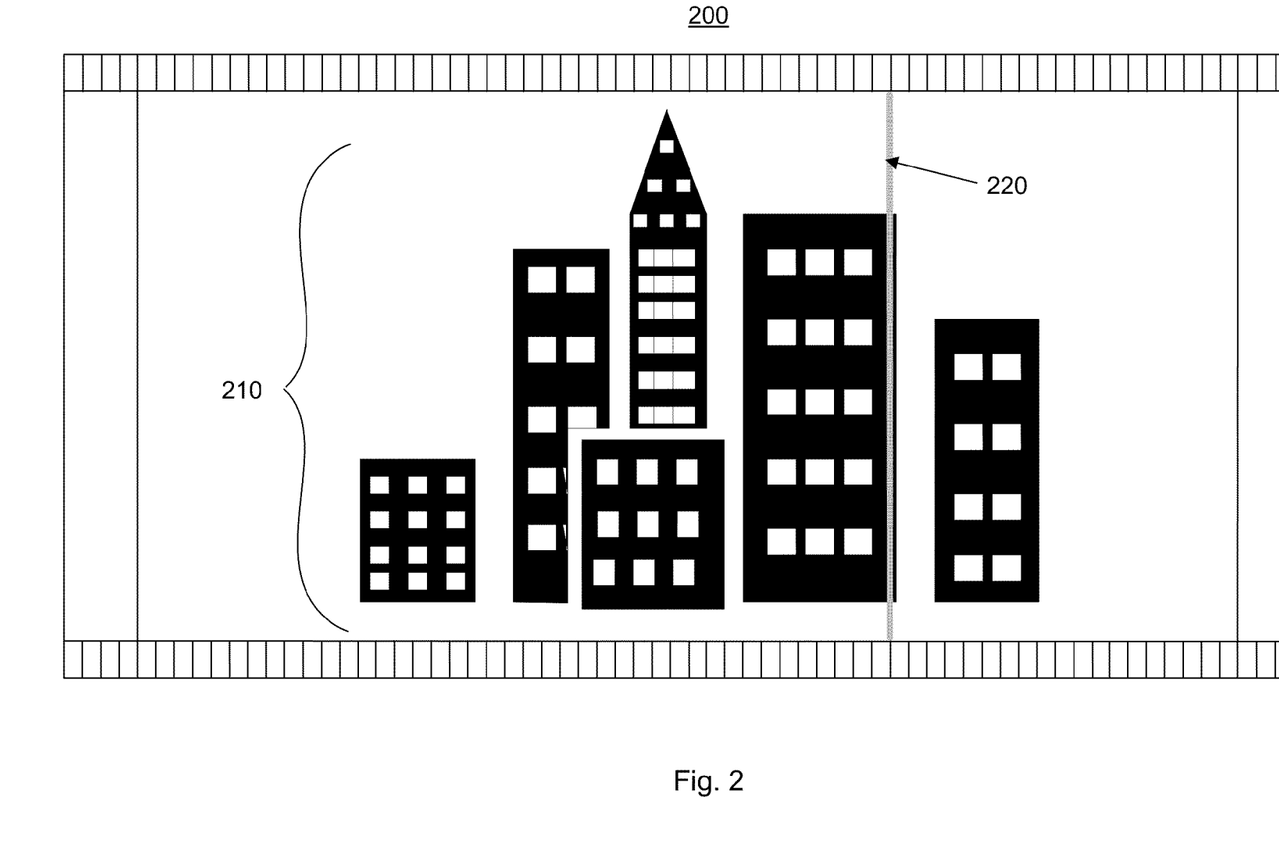
FIG. 2 is an illustration of an image that includes a vertical line artifact.

FIG. 2 is an illustration 200 of an image 210 that includes a vertical line artifact 220. The image 210 may be the result of processing of the array of pixels performed by processor 130 of FIG. 1. Because digital camera 110, also of FIG. 1, may include a defect, image 210 may include a vertical line artifact 220.

As described above, a vertical line artifact in an image captured with a digital camera may be indicative of a defect in the digital camera that causes vertical line artifacts to appear in many, if not all, frames of a large number of images, if not every image, captured by the digital camera at least until the defective imager is replaced. The consistent nature of the vertical line artifacts in images captured with the digital camera enables statistical methods to automatically detect, and correct, pixels in a defective column of pixels that make up the vertical line artifact.

Figure 3:
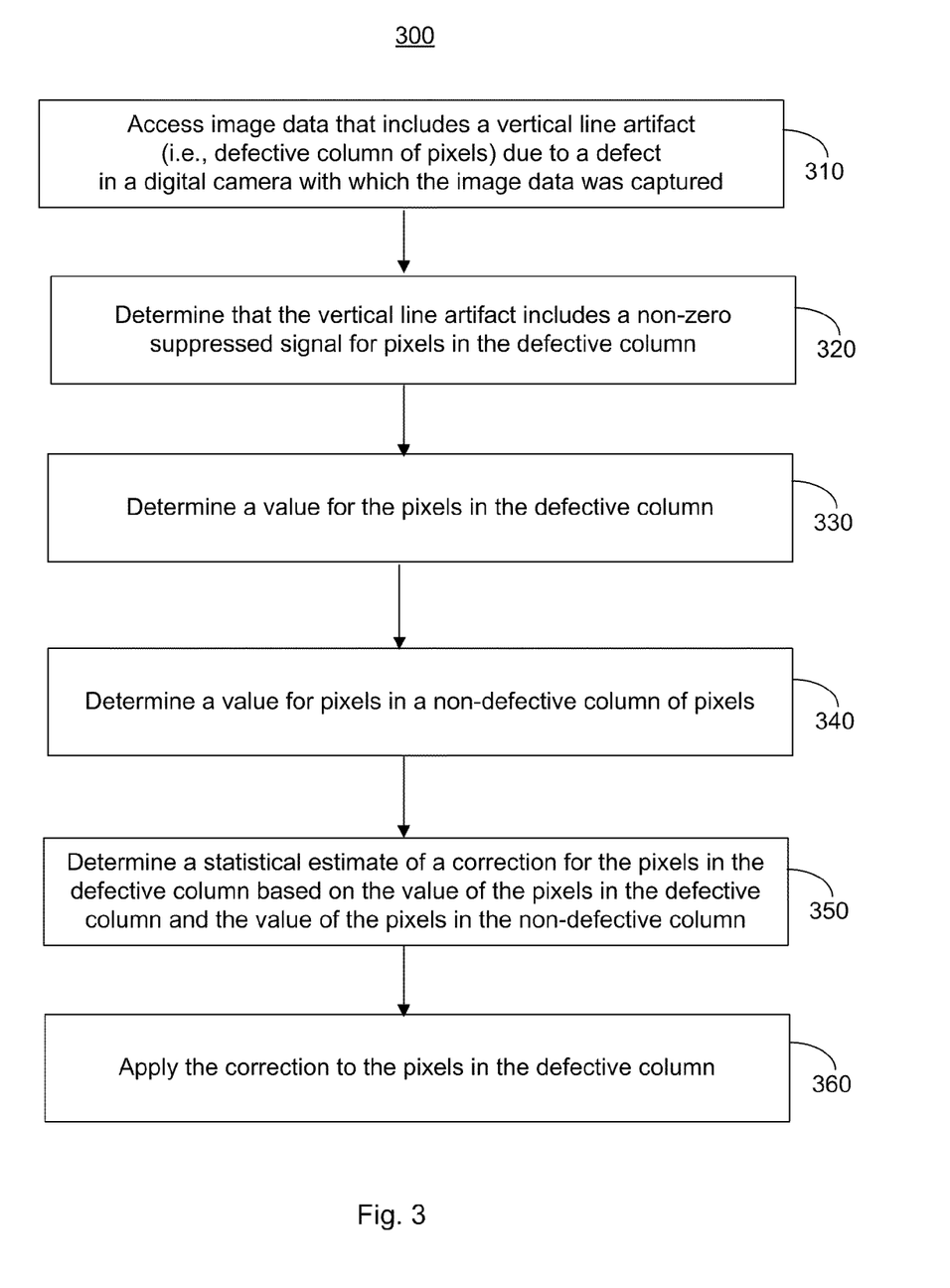
FIG. 3 is a flow chart of an exemplary process by which pixels in a defective column appearing as a vertical line artifact may be detected as having a suppressed signal and may be corrected by applying a correction to pixels corresponding to the defect.

FIG. 3 is a flow chart of an exemplary process by which pixels in a defective column appearing as a vertical line artifact may be detected as having a suppressed signal and may be corrected by applying a correction to pixels corresponding to the defect.

Image data may be accessed that includes a vertical line artifact due to a defect in a digital camera, such as digital camera 110 of FIG. 1, with which the image data was captured (310). The presence of a vertical line artifact may be determined based on information that is known about the digital camera with which the image was captured. For example, an operator may notice that images captured with the digital camera include a defect, such as a vertical line artifact, caused by a defective column of pixels. The determination also may be based on an automated determination that the image includes a vertical line artifact.

It may be determined that the vertical line artifact includes a non-zero suppressed signal for pixels in the defective column (320). Determining that the pixels in the defective column that make up the vertical line artifact include a suppressed signal, rather than a dead or ringing signal, may be based on detailed image analysis. For example, it may be determined that the pixel values of pixels in the defective column are not set to a minimum value (e.g., zero), as would be the case for a dead signal, and are not set to a maximum value (e.g., one) as would be the case for a ringing signal. Rather, the pixel values may be determined to include a suppressed value, such as a value that is much lower than that which would be expected for the column if it were not defective. For example, the suppressed values may be lower than values for other non-defective columns of pixels in the image. In some instances, instead of having a suppressed value, pixel values in a defective column may be determined to include values much higher than that which would be expected for the column if it were not defective.

The actual value for the pixels in the defective column may be determined (330). The value ascribed to a pixel is a representation of a brightness and color of the image at the location of the pixel. In the simplest case of binary images, a pixel value may be a 1-bit number that indicates either foreground or background. For a grayscale image, a pixel value may be a single number that represents brightness of the image at the location of the pixel. Another pixel value format may be referred to as a byte image, such that a pixel value may be stored as an 8-bit integer having a range of possible values from 0 to 255. Typically, zero may represent black, and 255 may represent white. Values in between 0 and 255 may represent different shades of gray.

To represent color images, separate red, green and blue components may be specified for a pixel. In this configuration, a pixel value may be represented as a vector of three numbers. Furthermore, the three different components may be stored as three separate grayscale images for the three color channels (e.g., the red, green and blue color channels). The values for a single pixel in each of the three color channels may be recombined to display or process the image at the location of the pixel. Thus, there may be up to nine values associated with a single pixel—three components for the same pixel as located in each of three color channels.

A value for pixels in a non-defective column of pixels also may be determined (340). A non-defective column may be selected from among many non-defective columns that may exist in a given color channel. The pixels in the non-defective column may have a value that is higher than the value of the pixels in the defective column.

A statistical estimate of a correction for the pixels in the defective column may be determined based on the value of the pixels in the defective column and the value of the pixels in the non-defective column (350). Because the value of the pixels in the defective column may be suppressed below the value of the pixels in the non-defective column, a successful correction may attempt to raise the value of the suppressed pixels in the defective column to a value that is commensurate with the value of the pixels in the non-defective column. Thus, a successful correction technique may require information about the values of the pixels in both the defective and the non-defective columns.

Pixel values may not be uniform throughout an image or even throughout a single column of pixels. The non-uniformity may be due to electronic noise, the randomness of photons striking the imager, an uneven number of electrons being released at adjacent pixels that are hit with the same photon strike, the data of the underlying image or some other reason. Thus, a static correction that simply raises the value of all pixels in the defective column to a single value that may have been determined to be commensurate with a value of a single pixel in the non-defective column may yield an unsatisfactory result. For example, the pixels in the now-corrected column may appear to be too "smooth," and thus the original vertical line artifact may be replaced with another vertical line artifact due to the too perfect correction.

Therefore, rather than a static correction technique, a statistical correction may be used to cause the new, corrected values of the pixels in the no-longer-defective column to more accurately mimic both the non-defective column and the values that would have been received for the defective column if the original, defective values were not suppressed.

The statistical correction may be applied to the pixels in the defective column (360). Applying the correction may adjust the pixel values of the pixels in the defective column so that the values more closely match the values of pixels in a non-defective column, thus causing the vertical line artifact to disappear or become less prominent.

Figure 4:
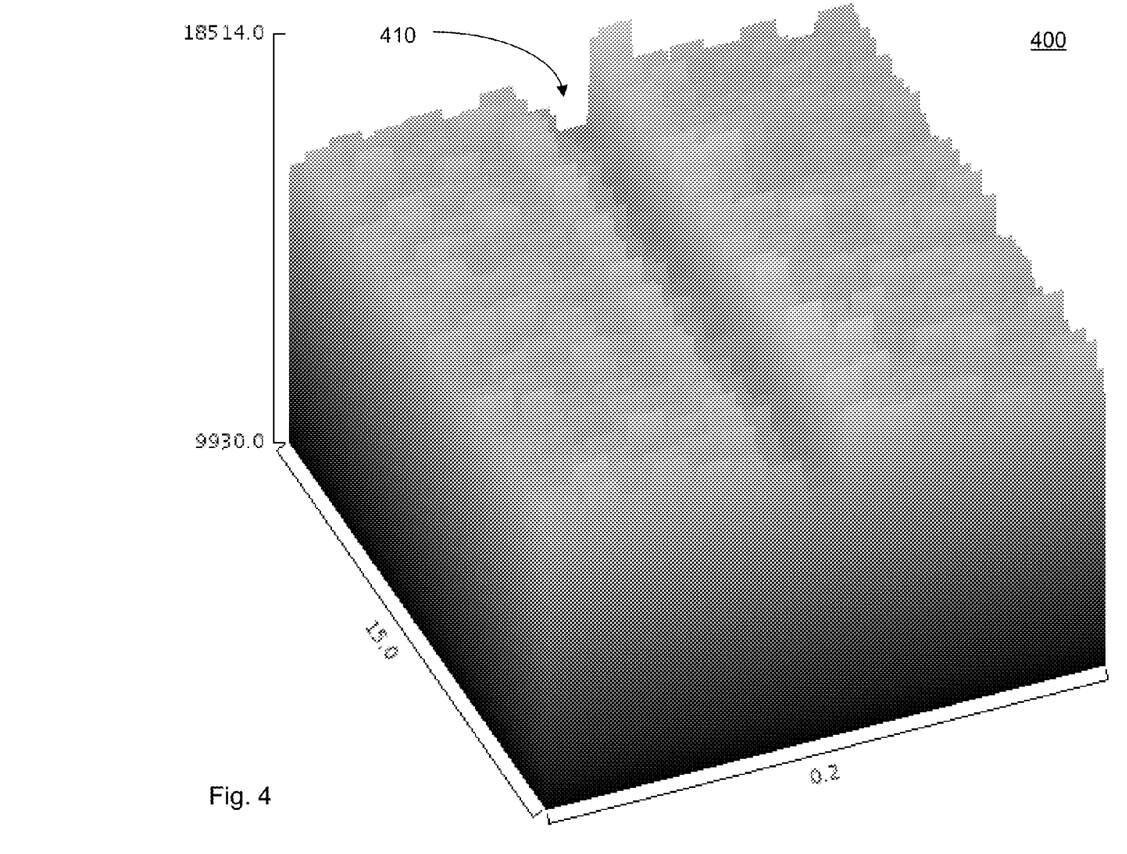
FIG. 4 is an illustration of a gray card showing a defective column.

FIG. 4 is an illustration of a gray card 400 showing a defective column of pixels 410. Defects that cause vertical line artifacts may be unique to a particular digital camera and also may be introduced during the manufacturing process. The defects may not be detected and located until an image is captured with the digital camera and processed. Thus, a correction for the defects also may not be determined until an image is captured and processed.

To determine where, and to what extent, vertical line artifacts may be caused by a defect in a particular digital camera, a gray card may be used. A gray card wedge image, or simply a gray card, such as gray card 400, may be created by filming a gray scene (such as, for example, a piece of cardboard painted gray). The color gray may be used because pixels in a completely gray image may include similar amounts of red, green and blue. Thus, the image captured by filming the gray card should, at least theoretically, yield approximately the same pixel value for a majority of pixels, if not every pixel, in the imaging area in every color channel. In this way, a defective column may more easily be detected because the pixels in the defective column would stand out by having a value that is less than the value of all of the other pixels.

However, due to a probabilistic element in an image-capture process, such as the randomness of the amount of energy that hits particular pixels on the imager, a degree of variation may exist between the values of the pixels in an image produced by filming a completely gray scene. Put differently, the pixels may not all have the same value. There is some variation in the pixel values as can be seen in the random heights of the pixels as shown in gray card 400.

A defective column, such as defective column 410, may easily be visible to the human eye when viewing the gray card due to the canyon-like shape of the defective column (as shown, for example, at element 410 of FIG. 4). However, because there is not a single value for all pixels on the gray card, it may be difficult to automatically detect a defective column of pixels. For example, it may not be clear which non-defective pixel value should be compared with other pixel values to determine if a given pixel is defective and is located within a larger, defective column of pixels. In other words, the randomness of the pixel values may cause a processor to incorrectly identify non-defective pixels as defective, or vice versa, and thus a defective column that may be visually apparent to an operator, may escape detection in an automated process.

As a result, information may be gleaned from the gray card and used to automatically detect and correct vertical line artifacts in images captured with the particular digital camera with which the gray card was filmed. The information may include location and statistical information related to pixels in a defective column, statistical information related to pixels in a non-defective column and the exposure at which the gray card was filmed. A representation of the accumulated statistical data for a column of pixels (referred to as a T-score) also may be calculated for each column in an image, as described below. The information related to defects for a particular digital camera may be stored in a gray card table and used to automatically detect and correct vertical line artifacts.

Figure 5:
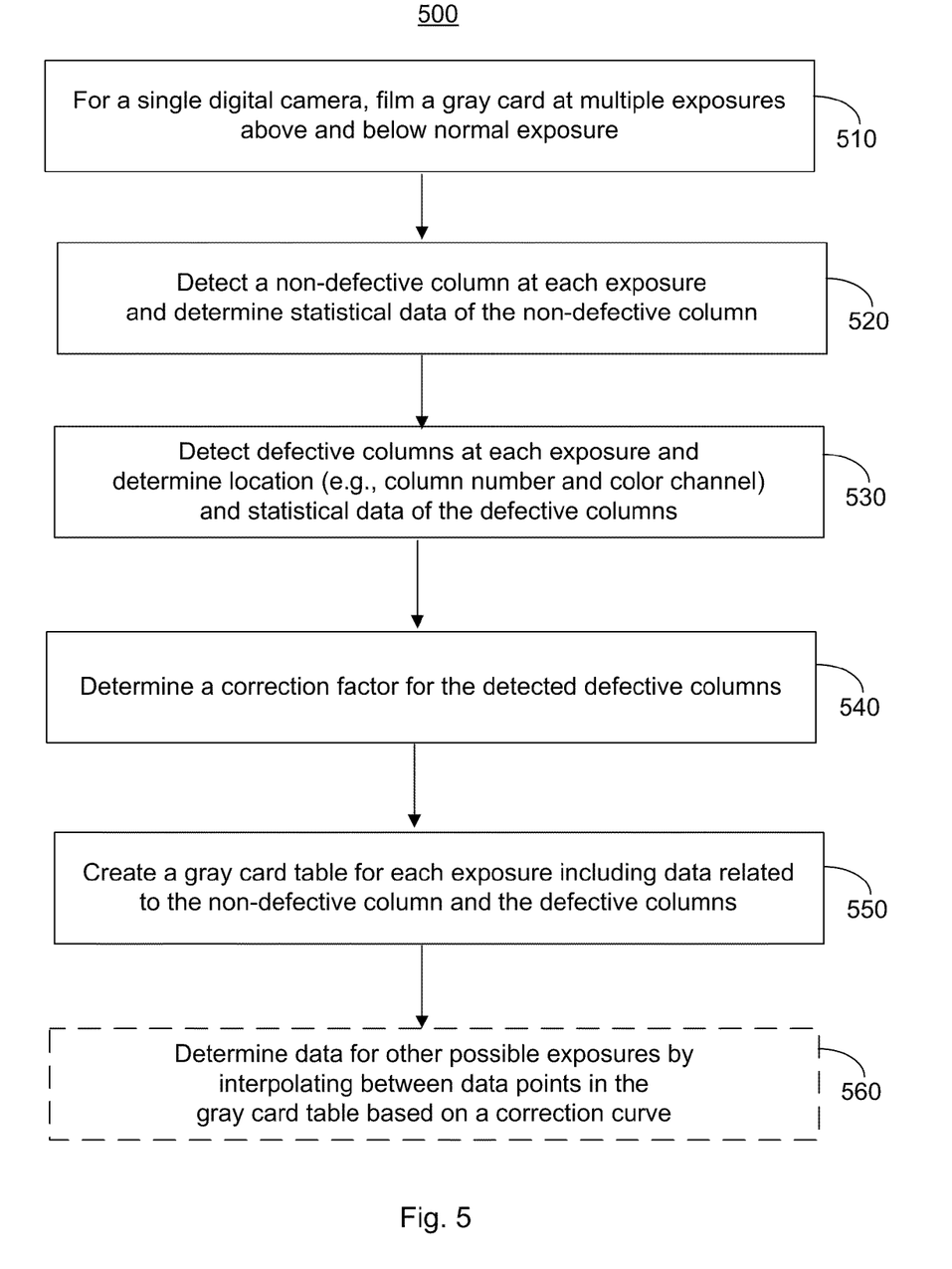
FIG. 5 is a flow chart of an exemplary process by which a gray card table may be created.

FIG. 5 is a flow chart of an exemplary process by which a gray card table may be created. As described above, a gray card table includes information about columns of pixels in an image filmed by a particular digital camera, which may be gleaned from a gray card filmed for the particular digital camera.

For a single digital camera, a gray card may be filmed at multiple exposures above and below normal exposure (510). A particular exposure may be selected as normal by a cinematographer. The normal exposure is an exposure at which an image of a person may appear most natural and flattering. A gray card may be filmed at additional exposures above and below the normal exposure within a reasonable range. The range may be selected to include exposures below which an image of a person may appear completely dark (e.g., black) and above which an image of a person may appear washed out (e.g., white). The difference between exposures, referred to as a t-stop, relates to an amount of light to which the imager of a digital camera is exposed.

For example, the gray card may be filmed at multiple exposures from −6 stops below normal exposure to +3 stops above normal exposure at ½ or ⅓ t-stop steps between the outer exposure levels. There may be no need to film the gray card outside of this range because even if a vertical line artifact exists at those additional exposures, it may not be seen in a washed out (e.g., white), or very dark (e.g., black) frame.

A non-defective column may be detected at each exposure and statistical data of the non-defective column may be determined (520). The non-defective column may be detected based on a gray card, such as gray card 400 of FIG. 4, by selecting any column that does not appear to be suppressed, or defective. The statistical data of the non-defective column may include a mean and a standard deviation for the pixels in the non-defective column. This information may be referred to as the "true mean" and "true standard deviation" because it is the statistical data for a non-defective column, and thus represents statistical information that should be approximately the same for all pixels in the gray card image captured by the digital camera.

A defective column may be detected at each exposure and the location of the defective column and statistical data of the defective column may be determined (530). A defective column may be detected manually, based on input from an operator who may perceive a canyon-shaped column in the gray card, or by an automated technique described below with respect to FIG. 7.

The location of the defective column may include geometry, such as the physical location or column number of the defective column, and a color channel in which the defective column is located, such as the red, green or blue color channel. The statistical data of the defective column may include a mean and a standard deviation for the pixels in the defective column, as well as a delta, defined as a number of standard deviations, between the mean of the non-defective column (i.e., true mean) and the mean of the defective column. If more than one defective column exists in a given exposure, or in the multiple exposures, more than one defective column may be detected and considered to determine location and statistical information. The data collected for a defective column may be used to characterize the defective column that has caused a vertical line artifact in an image captured with a digital camera. The characterization of the defective column may be used to determine a correction factor for the defective column, and apply the correction factor, causing the vertical line artifact to disappear.

A correction factor for each defective column detected at each exposure may be determined (540). The correction factor may be a statistical function that may be used to adjust the pixel values of a defective column so that the vertical line artifact is no longer visible and no new artifacts are created as a result of the correction.

In some implementations, the correction factor may include a separate correction factor for each pixel in the defective column. Alternatively, the correction factor may include one or more statistical functions for determining a correction factor for each of the pixel values in the defective column. The correction factor may be determined as described below with respect to FIG. 8.

A gray card table may be created for each exposure including the data related to the non-defective column and the defective columns (550). The gray card table may include statistical information related to the non-defective column determined for each exposure. In addition, the gray card table may represent a table of defects for a particular digital camera by including location, statistical and calculated information, such as a T-score, for each of the detected defective columns. Each defective column entry in the gray card table also may include a correction factor for the defective column. A single gray card table may be created for the particular digital camera at each exposure at which the gray card was filmed. Thus, a library of multiple gray card tables may exist for a single digital camera.

Data for other possible exposures may be determined by interpolating between data points in the gray card table based on a correction curve (560). Because gray cards are filmed at a limited number of exposures, an image may be captured with the particular digital camera at an exposure that was not contemplated during the gray card table creation process. To determine a correction factor for a defective column in an image captured at an exposure for which there is not a gray card table, the statistical information that does exist in the gray card tables may be interpolated between two adjacent gray card tables. The interpolation may be based on a correction curve that represents values for data, such as, for example, statistical data or location information, at additional exposures, particularly, exposures between those at which the gray card may have been filmed.

The gray card table information may be interpolated based on a correction curve because the values of pixels in a defective column are suppressed rather than dead or ringing. Because a partial signal may be present in the pixel values, the statistical data related to the defective column may follow the same curve, or spline, as the statistical data of non-defective columns. The only difference may be in the lower signal strength of the suppressed pixels of the defective column.

Statistical information for the defective column in the non-captured exposure may be determined and compared to the statistical information that has been interpolated between two adjacent gray card tables. The correction factor for the defective column in the non-captured exposure then may be determined by also interpolating the correction factors of the two adjacent gray tables along the correction curve.

Figure 6:
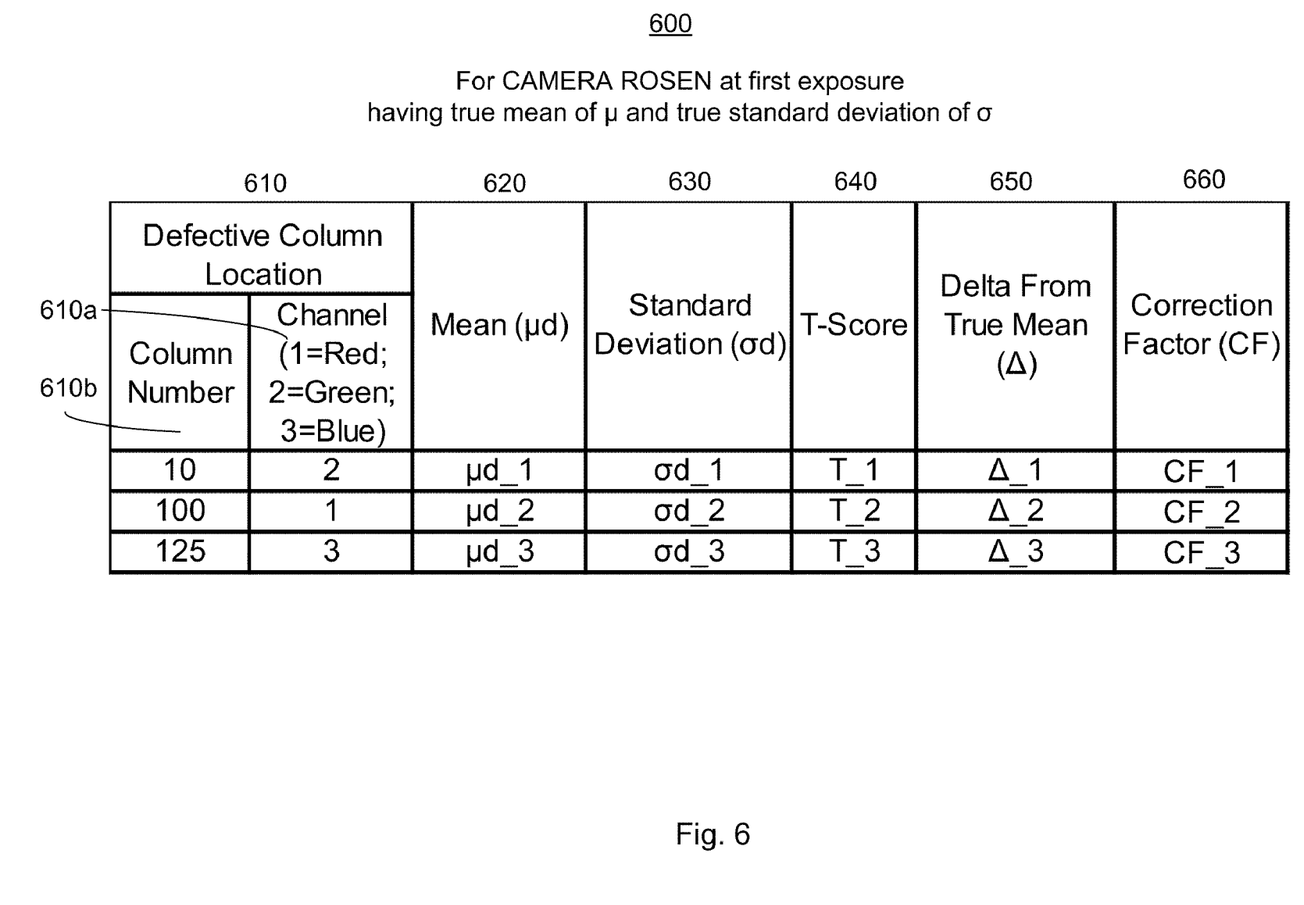
FIG. 6 is an illustration of a gray card table for a particular camera at a particular exposure.

FIG. 6 is an illustration of a gray card table 600 for a particular camera, CAMERA ROSEN, at a first exposure. The gray card table 600 includes statistical information for a non-defective column (i.e., true statistical information) detected at the first exposure. More particularly, gray card table 600 includes a true mean of p and a true standard deviation of σ.

Gray card table 600 also includes information for each defective column detected. For example, gray card table 600 includes information for three defective columns, one at column 10 in the green color channel, one at column 100 in the red color channel and one at column 125 in the blue color channel.

For each of the defective columns, gray card table 600 includes the location of a defective column 610, which may further include a column number 610a and a color channel 610b. The gray card table 600 may also include a mean ($\mu_d$) 620, a standard deviation ($\sigma_d$) 630, a T-score 640, a delta from true mean ($\Delta$) 650 and a correction factor (CF) 660 for each of the defective columns. The column number 610a may indicate the physical, or geometric, location of the defective column within an image and color channel 610b may indicate in which color channel the defective column resides. Mean 620 may indicate the average pixel value of the pixels in the defective column and standard deviation 630 may indicate the statistical measure of variability among the pixel values of the pixels in the defective column.

T-score 640 may be a representation of the statistical data for a column of pixels. The T-score may be compared with a threshold value to determine if a defect exists at a particular location (e.g., to determine if a particular column of pixels is defective and may cause a vertical line artifact to appear in a captured image). Delta from true mean 650 may indicate the number of standard deviations between the mean of the defective column and the true mean.

In some implementations, correction factor 660 may include a separate correction factor for each pixel in the defective column. Alternatively, correction factor 660 may include one or more statistical functions for determining a correction factor for each of the pixel values in the defective column. In either configuration, correction factor 660 may be used to adjust the pixel values of the defective column so that the vertical line artifact is no longer visible, or is less visible, and no new artifacts are created as a result of the correction.

More particularly, for example, the defective column located at column number 10 in the green channel has a mean of $\mu_d\_1$, a standard deviation of $\sigma_d\_1$, a T-score of T__1, a delta from true mean of $\Delta\_1$ and a correction factor of CF__1.

Figure 7:
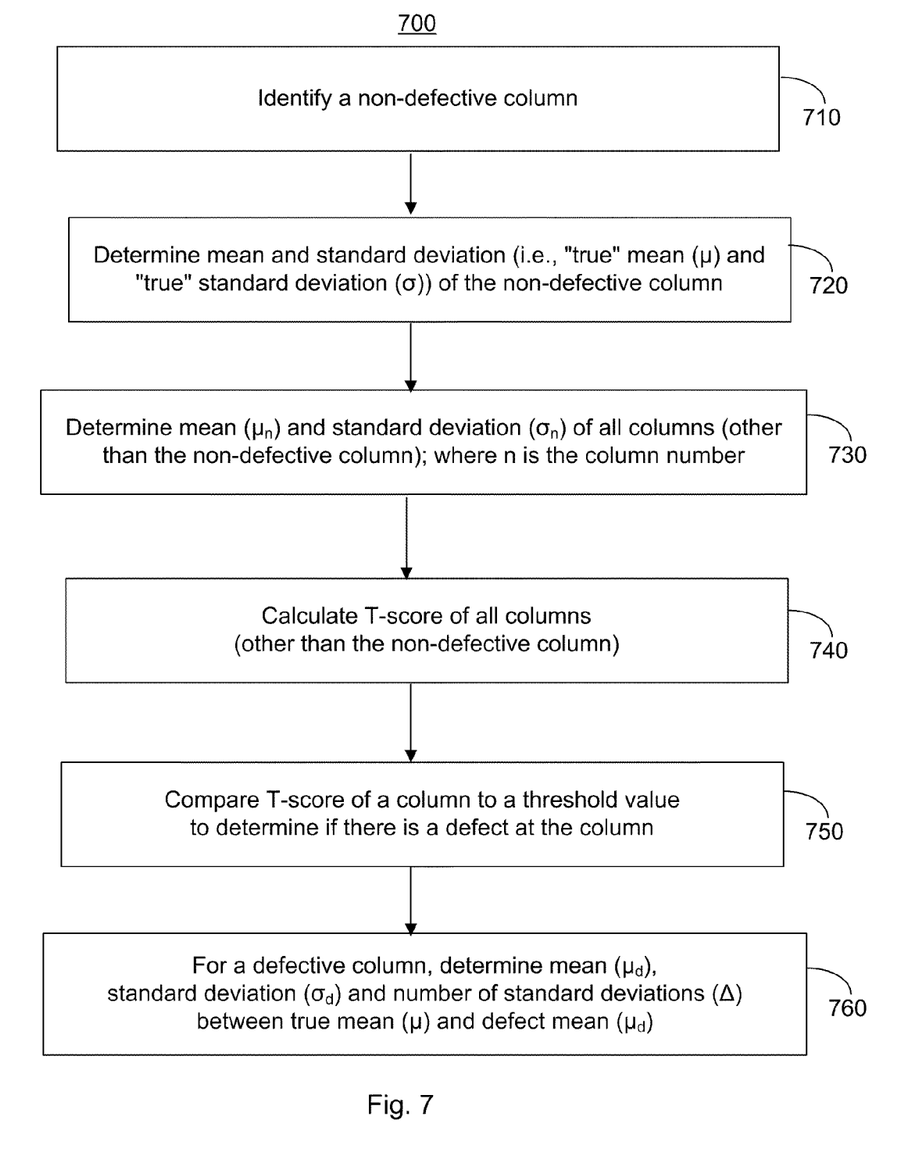
FIG. 7 is a flow chart of an exemplary process by which a defective column may be automatically detected.

FIG. 7 is a flow chart of an exemplary process by which a defective column may be automatically detected. The defective columns that are detected may be used to create gray card tables for a particular digital camera and further to detect defective columns in images captured by the particular digital camera.

A non-defective column may be identified (710). To identify the non-defective column, the pixel values of pixels in a majority of columns, if not every column, in a minimum number of frames, such as, for example, 10 frames, may be averaged. The mean of the pixel values for a majority of individual columns, if not every individual column, across the image then may be determined. The mean of the pixel values for the individual columns across the image may be compared to the average determined across the minimum number of frames. The column having a pixel value mean that may be closest to the average across the minimum number of frames may be selected as the non-defective column.

Alternatively, a non-defective column may be identified by manually detecting, with the naked eye, a column that is not defective. The non-defective column may be detected based on an operator's perception of a gray card, such as gray card 400 of FIG. 4, and selection of a column that does not appear to be suppressed. Alternatively, to identify a non-defective column, an operator may view an image captured with a digital camera that includes a defect and may select a column of pixels that corresponds to a line of pixels in the image that does not appear to include a vertical line artifact.

The mean ($\mu$) and standard deviation ($\sigma$) of the non-defective column may be determined (720). The mean and standard deviation of the non-defective column may be referred to as the true mean and true standard deviation.

The mean ($\mu_n$) and standard deviation ($\sigma_n$) of multiple columns (other than the non-defective column) may be determined, where n is the column number (730). The T-score may be calculated for columns other than the non-defective column (740). The T-score of a column ($T_n$) may be calculated using the following formula.

$$T_n = \frac{\mu_n - \mu}{(\sigma/n^{-2})}$$

where n is the column number, $\mu_n$ is the mean of a column n, $\mu$ is the true mean and $\sigma$ is the true standard deviation.

The T-score of an individual column ($T_n$) may be compared to a threshold value to determine if there is a defect at the column (750). Two types of errors may exist with respect to detecting a defective column. A type I error may exist when a defective column is identified as not being defective and a type II error may exist when a non-defective column is identified as a defective column. In some implementations, the value of the threshold may be selected based on a type II error, rather than a type I error, such that columns that are not defective may be marked as defective in order to ensure that no defective column goes undetected. When the absolute value of the T-score for a column n exceeds the threshold value, the column n may be deemed a defective column.

Once a defective column is detected, the mean ($\mu_d$), standard deviation ($\sigma_d$) and the number of standard deviations, or delta ($\Delta$), between the true mean ($\mu$) and the defect mean ($\mu_d$) may be determined (760). The determination of the statistical information may be used to characterize the defective column. Once a defective column has been characterized, the characterization may be used to determine a correction factor for the defective column and correct the value of pixels in the defective column, such that a vertical line artifact apparent in an image due to the defective column may disappear, or be reduced in significance.

Some or all of the steps of process 700 may be repeated to detect further defective columns and determine statistical information for the further defective columns.

Figure 8:
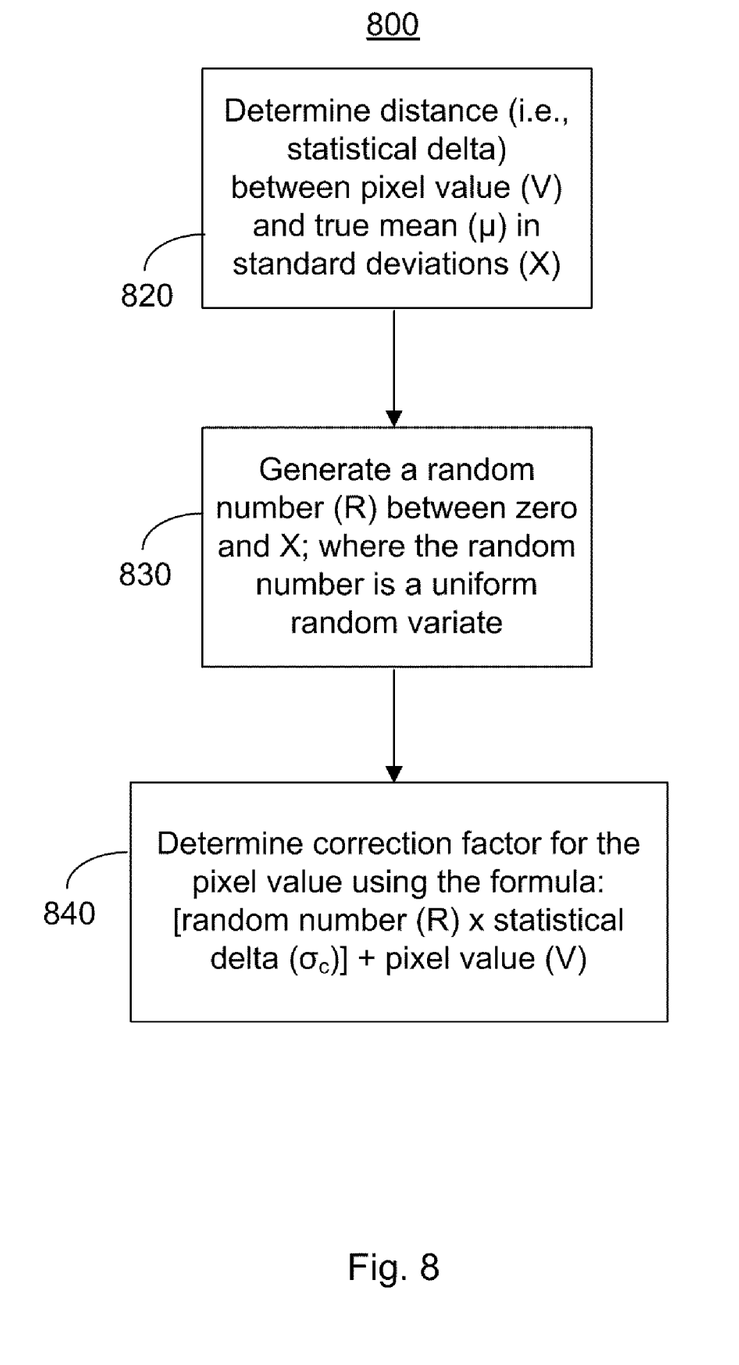
FIG. 8 is a flow chart of an exemplary process by which a correction factor may be determined.

FIG. 8 is a flow chart of an exemplary process by which a correction factor may be determined. Based on the statistical data determined for the defective columns that are detected either manually or by the automated process 700, a correction factor for pixels in the defective column may be determined.

Figure 9:
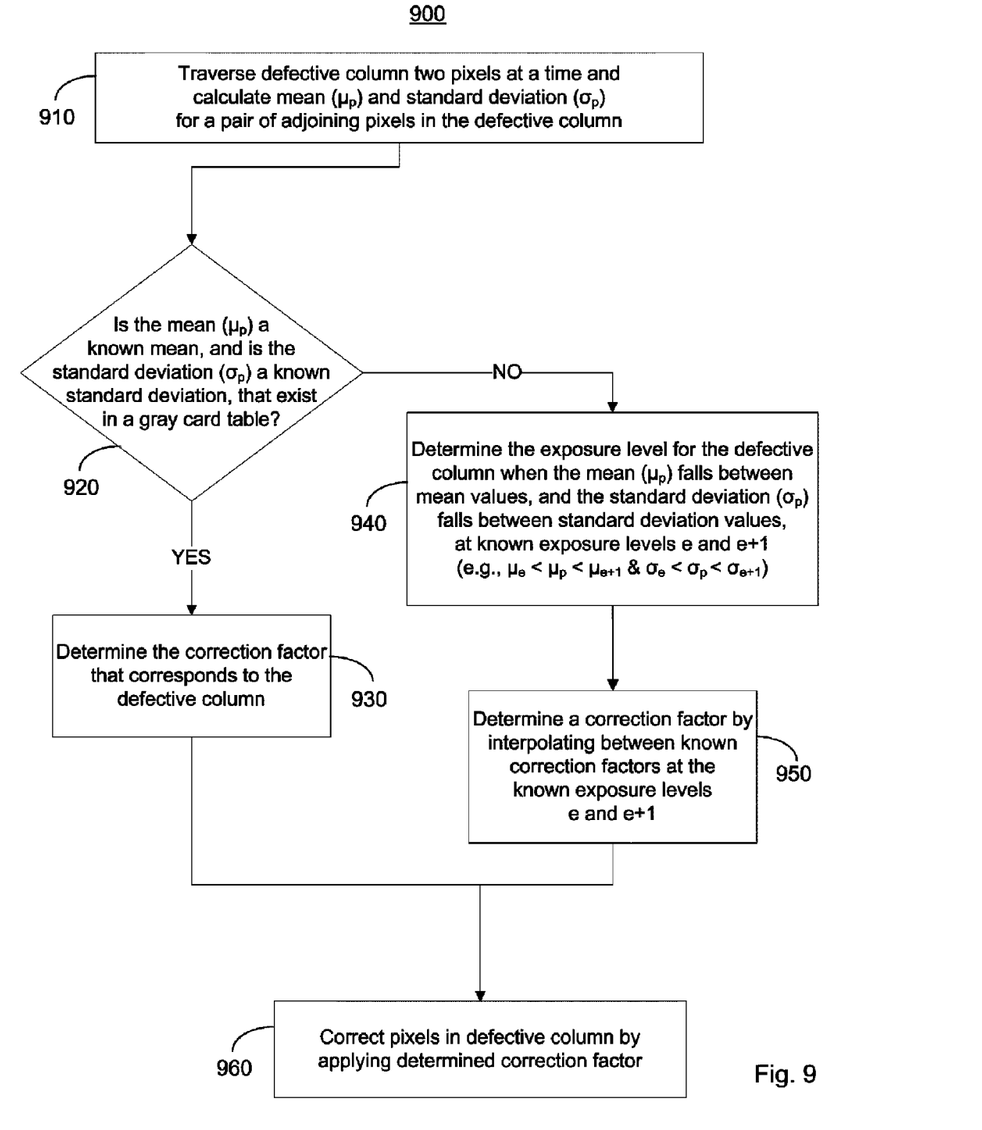
FIG. 9 is a flow chart of an exemplary process by which a correction factor may be applied to pixels in a defective column at an exposure that falls between two gray card tables.

For a pixel in a column, the distance between the pixel value (V) and the true mean ($\mu$) may be determined as a number of standard deviations (X) (820). The determined distance may be referred to as the determined statistical delta ($\sigma_c$). A random number (R) may be generated between zero and the number of standard deviations (X) (830). The random number R may be a uniform random variate (e.g., a random number generated based on a uniform input). The correction factor for the pixel may be determined using the following formula (840).

$$CF=(R \times \sigma_C)+V$$

where R is the random number, V is the pixel value and $\sigma_c$ is the determined statistical delta at the exposure in which the pixel exists, where $\sigma_c$ may be calculated using the following formula.

$$\sigma_C = \Delta \times \sigma_p$$

where $\Delta$ is the number of standard deviations between the true mean ($\mu$) and the defect mean ($\mu_d$) as determined in operation 760 of FIG. 7 and $\sigma_p$ is the standard deviation at an exposure between two gray cards (e.g., the standard deviation interpolated between two known standard deviations at two known exposures), as described in detail below with respect to FIG. 9.

The correction factor for each pixel, or more particularly, a statistical function to determine a correction factor for each pixel, as described above, may be stored in the gray card table that includes the defective column in which the pixel exists.

In some implementations, a determination may be made as to whether a particular pixel value needs correction. The determination may be based on a pre-selected threshold or pre-determined statistical model on a pixel-by-pixel basis. If it is determined that a particular pixel does not need correction, the particular pixel may not be corrected. However, if it is determined that a particular pixel does need correction, the particular pixel may be corrected by applying a correction factor, as described above.

FIG. 9 is a flow chart of an exemplary process by which a correction factor may be applied to pixels in a defective column at an exposure that falls between two gray card tables. A defective column may be traversed two pixels at a time and the mean ($\sigma_p$) and standard deviation ($\sigma_p$) may be calculated for a pair of adjoining pixels in the defective column (910). It may be determined whether the mean ($\mu_p$) and standard deviation ($\sigma_p$) are a known mean and a known standard deviation that exist in a gray card table (920). If so, the correction factor that corresponds to the defective column may be determined by accessing the gray card table in which a defective column having the mean $\mu_p$ and standard deviation $\sigma_p$ exists (930).

If not, the exposure level for the defective column may be determined when the mean ($\mu_p$) falls between mean values at known exposure levels e and e+1 and the standard deviation ($\sigma_p$) falls between standard deviation values at the known exposure levels e and e+1 (940). In other words, the exposure level may be determined when the mean for the defective column ($\mu_p$) is between the mean for a defective column at exposure level e ($\mu_e$) and the mean for a defective column at exposure level e+1 ($\mu_{e+1}$) and the standard deviation for the defective column ($\sigma_p$) is between the standard deviation for a defective column at exposure level e ($\sigma_e$) and the standard deviation for a defective column at exposure level e+1 ($\sigma_{e+1}$). A correction factor for the defective column may be determined by interpolating between known correction factors at the known exposure levels e and e+1 (950).

To determine a correction factor for a defective column in an image captured at an exposure for which there is not a gray card table, the statistical information that does exist in the gray card tables may be interpolated between two adjacent gray card tables. The interpolation may be based on a correction curve that represents values for data, such as, for example, statistical data or location information, at additional exposures, particularly, exposures between those at which the gray card may have been filmed.

The gray card table information may be interpolated based on a correction curve because the values of pixels in a defective column are suppressed rather than dead or ringing. Because a partial signal may be present in the pixel values, the statistical data related to the defective column may follow the same curve, or spline, as the statistical data of non-defective columns. The only difference may be in the lower signal strength of the suppressed pixels of the defective column.

For example, if a correction factor for pixels in a defective column at exposure level e is CF_1 and a correction factor for pixels in a defective column at exposure level e+1 is CF_3, interpolating, based on the correction curve, as described above, may yield a correction factor for the defective column having a mean $\mu_p$, and at an exposure level between e and e+1, of CF_2.

The pixels in the defective column may be corrected by applying the determined correction factor (960). The determined correction factor may be applied as described above with respect to FIG. 8.

In some implementations, the operations described may be performed by a digital camera system including a digital camera for capturing an image and a processor configured to detect and correct a vertical line artifact in the image. Additionally, or alternatively, the operations described may be performed in a post-production processing environment also including a processor configured to detect and correct a vertical line artifact in the image.

In some implementations, the gray card tables are static and may be stored in a data store that may be accessed by a processor, such as processor 130 of FIG. 1, configured to execute the process for defective column detection and correction. However, the correction curve for interpolating between gray card tables may be generated on either an ad hoc basis (e.g., when an interpolation between gray card tables is required to determine a correction factor for a defective column at an exposure between the known exposures for two adjacent gray card tables) or automatically at the time that the process for defective column detection and correction is initialized. In some implementations, the correction curve also may be static and stored in a data store that may be accessed by the processor configured to execute the process for defective column detection and correction.

In some implementations, values of pixels in a defective column may be determined to include a suppressed value, such as a value that is much lower than that which would be expected for the column if it were not defective. For example, the suppressed values may be lower than values for other non-defective columns of pixels in the image. In this configuration, a correction factor applied to the defective pixels may aim to boost the pixel values such that the pixel values in the formerly-defective column may now be commensurate with pixel values in a non-defective column. Additionally, or alternatively, instead of having a suppressed value, pixel values in a defective column may be determined to include values much higher than that which would be expected for the column if it were not defective. In other words, instead of being suppressed, the pixel values in a column of pixels causing a vertical line artifact may be inflated. In this configuration, a correction factor applied to the defective pixels may aim to deflate the pixel values such that the pixel values in the formerly-defective column may now be commensurate with pixel values in a non-defective column.

In some implementations, multiple correction factors may be applied to pixels in a defective column of pixels. For example, a correction factor may be applied based on a difference in pixel values of pixels in a defective and a non-defective column. Additionally, or alternatively, a correction factor may be applied based on an exposure level, an ambient light, or color level, or some other problem with the image captured by the digital camera.

In some implementations, a correction factor may be a single value, rather than a statistical formula. In this configuration, the current value of a pixel in a defective column may be corrected by adding the correction factor to the current pixel value, multiplying the current pixel value by the correction factor, or otherwise applying the correction factor to the current pixel value.

In some implementations, when identification of a defective columns of pixels, or a vertical line artifact caused by a defective column of pixels, may be performed manually, an operator may be prompted to identify the defective column in several different manners. For example, an operator may be provided with an image and may be asked to indicate a location of a vertical line artifact that appears in the image. In another example, a defective column that has been automatically detected may be provided to an operator for confirmation that the column has, in fact, caused a vertical line artifact, and thus is defective.

Some defects in a solid state imager of a particular digital camera may cause a vertical line artifact to appear in the same location, both with respect to geometry (physical column location, such as, for example, at column 100) and color channel (such as one of color channels red, green or blue) in all frames of every image captured with the digital camera. The way to prevent the vertical line artifacts from appearing in images captured with the digital camera, in this configuration, may be to replace the solid state imager. However, because solid state imagers may be very expensive (e.g., more expensive than a replacement digital camera), the techniques for detecting and correcting vertical line artifacts that occur due to a defect in the imager, as described in this document, may be crucial for any business, organization or individual that requires defect-free images captured with the digital camera.

Image data having a suppressed signal defect, such as a defective column of pixels, may be corrected, such that a display of the image data may be substantially free of any vertical line artifacts arising from a defect in a digital camera. The corrected image data also may be substantially free of any residual vertical line artifacts caused by insufficient correction techniques, such as, for example, a correction model that assumes that vertical line artifacts are caused by defective read-out wells or a correction model that replaces a value of a pixel in a defective column with an average of pixel values from pixels in columns adjoining the defective column, as described in detail above. Being substantially free of any vertical line artifacts and any residual vertical line artifacts may mean that when the corrected image data is displayed, no original vertical line artifacts or residual vertical line artifacts are visually perceptible to an audience who is viewing the display of the corrected image data.

The corrected image data may be stored on a portable device, such as, for example, a digital video disk (DVD) that includes a medium configured to record information, such as, for example, corrected image data. A first frame and a second frame may be recorded on the medium, such that the first and second frames correspond to image data that, prior to correction, included a vertical line artifact arising from a defect in a digital camera with which the image data was captured. The first frame and the second frame may be included in a sequence of frames recorded on the medium. The sequence of frames may include an entire movie. The sequence of frames may be configured to reproduce a display of the image data in at least the first frame, which previously included a vertical line artifact arising from the defect in the digital camera. The display of the content may be substantially free of a vertical line artifact caused by the defect in the digital camera and any residual vertical line artifacts that may have been caused by insufficient correction techniques.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for detecting a vertical line artifact in a column of pixels, the method comprising:
   accessing image data captured from a single digital camera, the image data including multiple columns of pixels with each column of pixels having data for multiple, different color channels;
   identifying a non-defective column of pixels included in the image data captured from the single digital camera;
   determining a true mean and a true standard deviation for the non-defective column of pixels included in the image data captured from the single digital camera;
   determining a mean and a column number for other columns of pixels that are included in the multiple columns of pixels and that are different from the identified non-defective column of pixels;
   computing, for each of the other columns of pixels, a score based on the mean and column number determined for the other columns of pixels and the true mean and true standard deviation determined for the non-defective column of pixels;
   comparing the computed scores to a threshold value;
   based on the comparison, determining whether a vertical line artifact having a non-zero suppressed signal exists at each of the other columns of pixels; and
   conditioned on a determination that a vertical line artifact exists at a defective column of pixels included in the other columns of pixels, identifying a location of the defective column of pixels and storing, in electronic storage, the identified location of the defective column of pixels.

2. The method of claim 1, further comprising, after identifying the location of the defective column of pixels, determining statistical information that characterizes the defective column of pixels and using the characterization of the defective column of pixels to determine a correction factor for the defective column of pixels.

3. The method of claim 2, wherein determining statistical information that characterizes the defective column of pixels comprises determining statistical information that characterizes the defective column of pixels based on statistical data determined for the defective column of pixels and statistical data determined for the non-defective column of pixels.

4. The method of claim 3, wherein determining statistical information that characterizes the defective column of pixels based on statistical data determined for the defective column of pixels and statistical data determined for the non-defective column of pixels comprises:
   identifying a first mean of pixel values included in the defective column of pixels;
   identifying a second mean of pixel values included in the non-defective column of pixels; and
   determining a delta between the identified first mean of pixel values included in the defective column of pixels and the identified second mean of pixel values included in the non-defective column of pixels.

5. The method of claim 4, wherein determining a delta between the identified first mean of pixel values included in the defective column of pixels and the identified second mean of pixel values included in the non-defective column of pixels comprises determining a delta in terms of a number of standard deviations between the identified second mean of pixel values included in the non-defective column of pixels and the identified first mean of pixel values included in the defective column of pixels.

6. The method of claim 1, wherein identifying the non-defective column of pixels included in the image data captured from the single digital camera comprises:
   averaging pixel values of pixels in a majority of columns over a minimum number of frames;
   determining a mean of pixel values for a majority of individual columns across an image area within the image data;
   comparing the mean of the pixel values for the individual columns across the image area within the image data to the average determined over the minimum number of frames; and
   based on comparison results, selecting a column having a pixel value mean that is closest to the average over the minimum number of frames as the non-defective column of pixels.

7. The method of claim 1, wherein identifying the non-defective column of pixels included in the image data captured from the single digital camera comprises identifying the non-defective column of pixels included in the image data captured from the single digital camera based on received user input.

8. The method of claim 1, wherein identifying the location of the defective column of pixels comprises identifying a column number of the defective column of pixels and a color channel within the defective column of pixels at which the vertical line artifact exists.

9. A post-production processing system comprising:
   a processor; and
   a non-transitory computer-readable storage medium encoded with executable instructions that, when executed by the processor, causes the processor to perform operations comprising:
      accessing image data captured from a single digital camera, the image data including multiple columns of pixels with each column of pixels having data for multiple, different color channels;
      identifying a non-defective column of pixels included in the image data captured from the single digital camera;
      determining a true mean and a true standard deviation for the non-defective column of pixels included in the image data captured from the single digital camera;
      determining a mean and a column number for other columns of pixels that are included in the multiple columns of pixels and that are different from the identified non-defective column of pixels;
      computing, for each of the other columns of pixels, a score based on the mean and column number determined for the other columns of pixels and the true mean and true standard deviation determined for the non-defective column of pixels;
      comparing the computed scores to a threshold value;
      based on the comparison, determining whether a vertical line artifact having a non-zero suppressed signal exists at each of the other columns of pixels; and
      conditioned on a determination that a vertical line artifact exists at a defective column of pixels included in the other columns of pixels, identifying a location of the defective column of pixels and storing, in electronic storage, the identified location of the defective column of pixels.

10. The system of claim 9, wherein the operations further comprise, after identifying the location of the defective column of pixels, determining statistical information that characterizes the defective column of pixels and using the characterization of the defective column of pixels to determine a correction factor for the defective column of pixels.

11. The system of claim 10, wherein determining statistical information that characterizes the defective column of pixels comprises determining statistical information that characterizes the defective column of pixels based on statistical data determined for the defective column of pixels and statistical data determined for the non-defective column of pixels.

12. The system of claim 11, wherein determining statistical information that characterizes the defective column of pixels based on statistical data determined for the defective column of pixels and statistical data determined for the non-defective column of pixels comprises:

identifying a first mean of pixel values included in the defective column of pixels;

identifying a second mean of pixel values included in the non-defective column of pixels; and determining a delta between the identified first mean of pixel values included in the defective column of pixels and the identified second mean of pixel values included in the non-defective column of pixels.

13. The system of claim 12, wherein determining a delta between the identified first mean of pixel values included in the defective column of pixels and the identified second mean of pixel values included in the non-defective column of pixels comprises determining a delta in terms of a number of standard deviations between the identified second mean of pixel values included in the non-defective column of pixels and the identified first mean of pixel values included in the defective column of pixels.

14. The system of claim 9, wherein identifying the non-defective column of pixels included in the image data captured from the single digital camera comprises:

averaging pixel values of pixels in a majority of columns over a minimum number of frames;

determining a mean of pixel values for a majority of individual columns across an image area within the image data;

comparing the mean of the pixel values for the individual columns across the image area within the image data to the average determined over the minimum number of frames; and based on comparison results, selecting a column having a pixel value mean that is closest to the average over the minimum number of frames as the non-defective column of pixels.

15. The system of claim 9, wherein identifying the non-defective column of pixels included in the image data captured from the single digital camera comprises identifying the non-defective column of pixels included in the image data captured from the single digital camera based on received user input.

16. The system of claim 9, wherein identifying the location of the defective column of pixels comprises identifying a column number of the defective column of pixels and a color channel within the defective column of pixels at which the vertical line artifact exists.

17. The method of claim 1, further comprising:

once the defective column is detected, determining a defect mean for the defective column, a defect standard deviation for the defective column, and a delta between the true mean and the defect mean; and determining a correction factor for the defective column based on the defect mean for the defective column, the defect standard deviation for the defective column, and the delta between the true mean and the defect mean.

18. The method of claim 17, further comprising storing, in association with the identified location of the defective column of pixels, the defect mean for the defective column, the defect standard deviation for the defective column, the delta between the true mean and the defect mean, and the correction factor.

19. The method of claim 17, wherein determining the delta between the true mean and the defect mean comprises determining a number of standard deviations between the true mean and the defect mean.

20. The method of claim 19, wherein determining the correction factor for the defective column comprises determining a correction factor for the defective column based on a random number, a pixel value for a pixel included in the defective column, the number of standard deviations between the true mean and the defect mean, and a standard deviation interpolated between two known stand deviations at two known exposures.

* * * * *